United States Patent
Margetts

[11] 3,874,481
[45] Apr. 1, 1975

[54] AUTOMATIC ADJUSTER FOR A SHOE DRUM BRAKE

[75] Inventor: Hugh Grenville Margetts, 7 Derwent Close, Leamington Spa, Warwickshire, England

[73] Assignee: Girling Limited, Birmingham, England

[22] Filed: Oct. 5, 1973

[21] Appl. No.: 404,375

[30] Foreign Application Priority Data
Oct. 6, 1972 United Kingdom............... 46357/72

[52] U.S. Cl....................... 188/79.5 GT, 188/196 B
[51] Int. Cl............................................. B16d 65/58
[58] Field of Search ... 188/79.5 B, 79.5 P, 79.5 GT, 188/106 A, 106 F, 196 B, 196 BA, 196 V

[56] References Cited
UNITED STATES PATENTS

| | | | |
|---|---|---|---|
| 2,152,544 | 3/1939 | Field............................ | 188/79.5 GT |
| 2,465,063 | 3/1949 | Cleveland..................... | 188/79.5 GT |
| 2,570,398 | 10/1951 | Smith............................ | 188/79.5 B |
| 3,400,787 | 9/1968 | Keller et al................... | 188/79.5 GT X |

*Primary Examiner*—Duane A. Reger
*Attorney, Agent, or Firm*—Scrivener Parker Scrivener and Clarke

[57] ABSTRACT

In an automatic adjuster for a shoe-drum brake in which a two-part strut of adjustable length extends between the shoes adjacent to their actuated ends one part of the strut is formed by a bell-crank lever pivoted on a pin having limited movement relative to the other part which carries a non-rotatable peripherally toothed stud, and one arm of the lever is engaged in a clearance opening in a web of a shoe while the other arm has an arcuate toothed edge resiliently urged into engagement with the stud.

3 Claims, 5 Drawing Figures

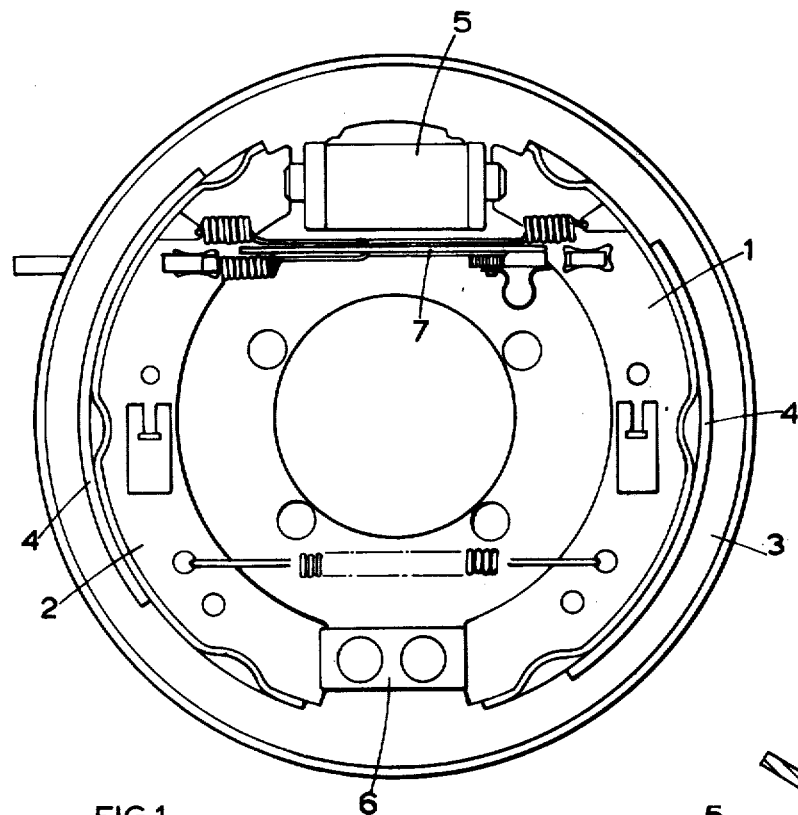
FIG.1.
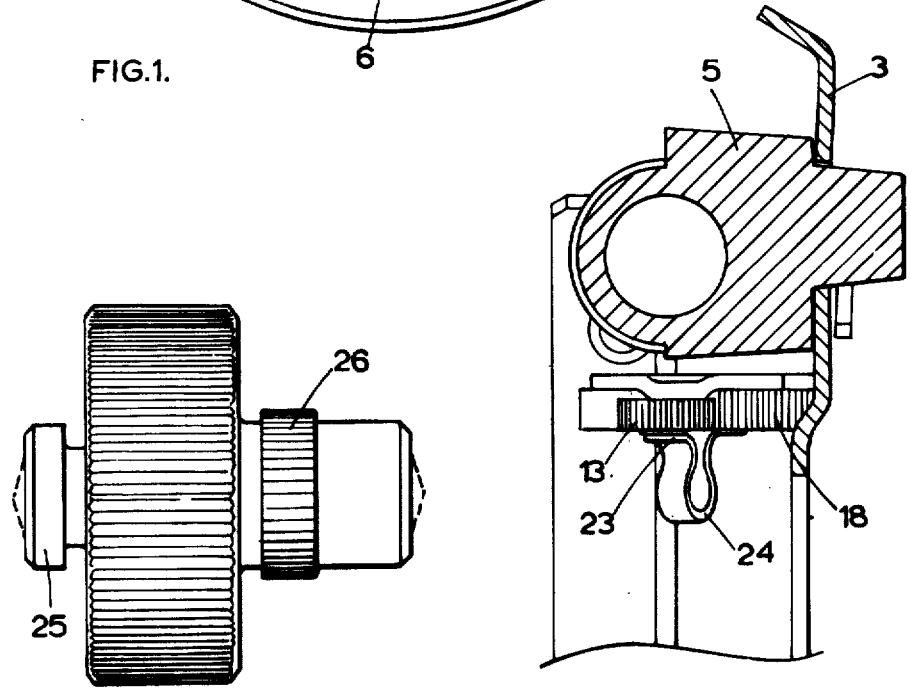
FIG.5.
FIG.4.

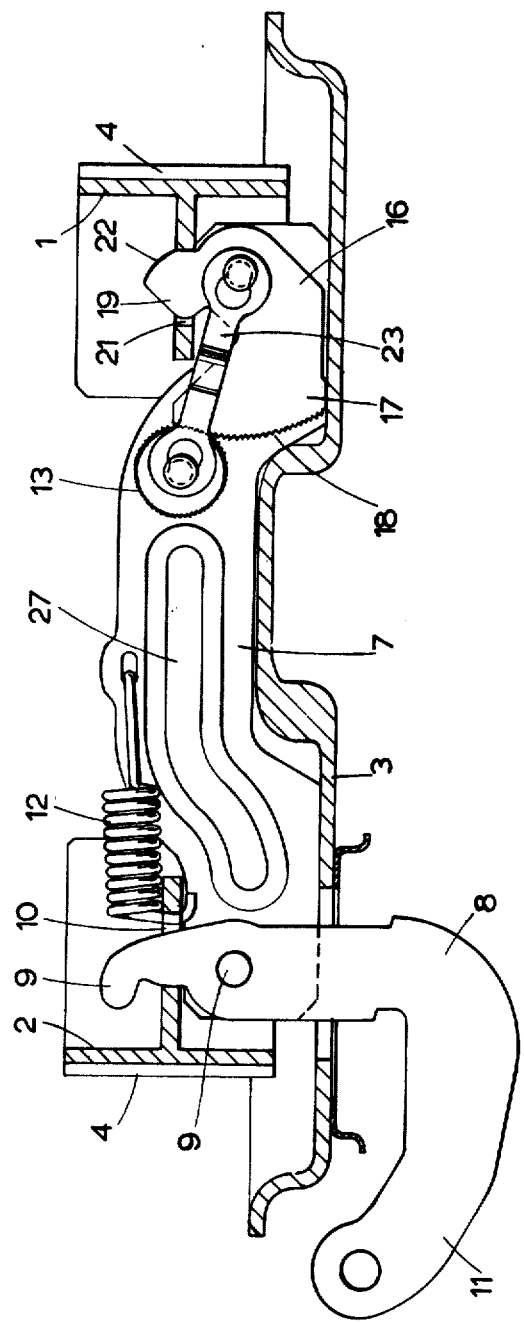

3,874,481

AUTOMATIC ADJUSTER FOR A SHOE DRUM BRAKE

This invention relates to improvements in internal shoe-drum brakes incorporating automatic adjusters for the shoes to compensate for wear of the shoe linings.

In the Complete Specification of our U.S.A. Patent Application Ser. No. 291,170 now U.S. Pat. No. 3,911,537 we have described an automatic adjuster for a shoe-drum brake comprising a two part strut extending between the shoes adjacent to their actuated ends, one part of the strut being formed by a bell-crank lever which is pivotally mounted on the other part, one arm of the lever co-operating with the web of one of the shoes and the second arm co-operating with a toothed element rigid with the said other part of the strut.

According to the present invention, in an adjuster for a shoe-drum brake as described and claimed in that application the toothed element of the adjuster comprises a toothed stud or spigot non-rotatably mounted in said other part of the strut.

Preferably teeth are formed all round the stud or spigot by rolling or knurling.

Conveniently the bell-crank lever is resiliently urged towards the stud or spigot by a plate spring acting between the pivot of the bell-crank lever and the stud or spigot.

A brake incorporating an automatic adjuster in accordance with the present invention is illustrated by way of example in the accompanying drawings in which:

FIG. 1 is an end view of the brake,

FIG. 3 is a section view of a portion of FIG. 2, FIG. 4 is a section, and FIG. 5 is a side elevation of the toothed stud part of the mechanism.

Figure 2:
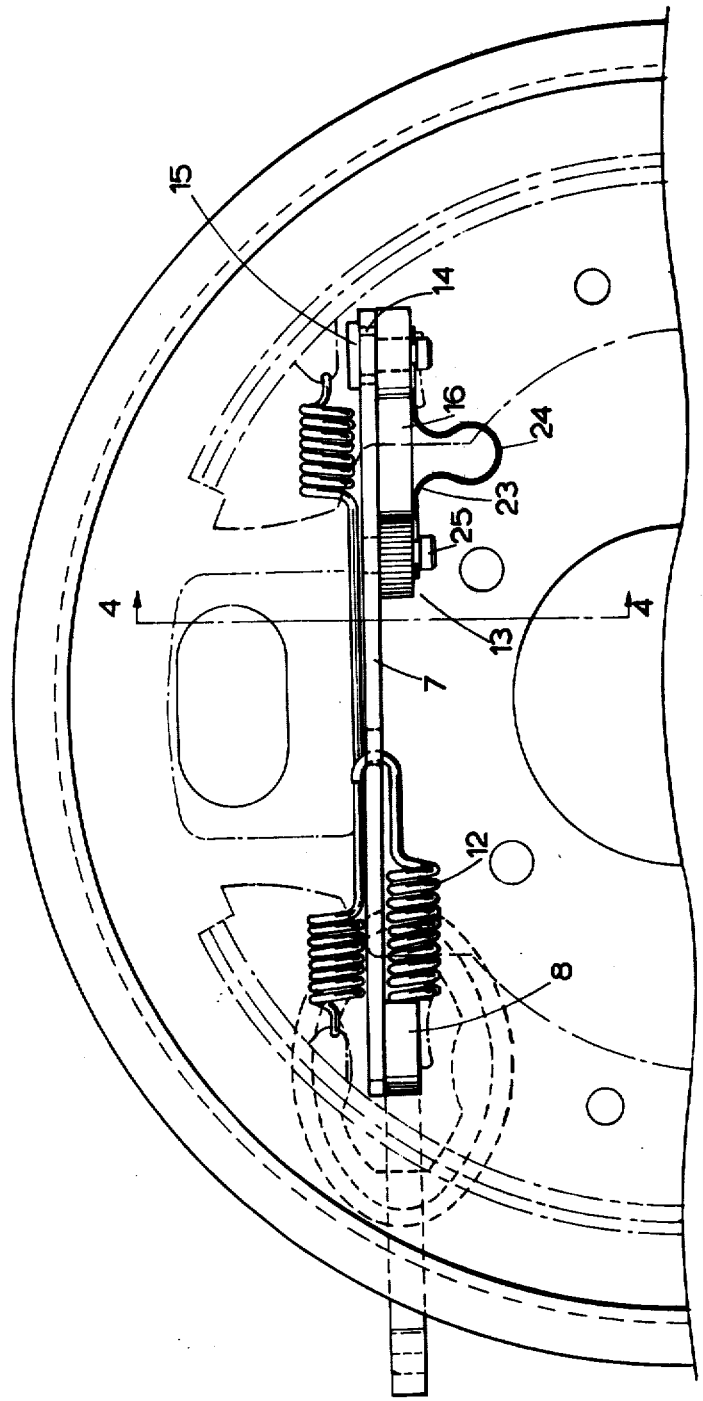
FIG. 2 is an end view of the adjuster and the adjacent parts of the brake on a larger scale.

The brake illustrated incorporates opposed arcuate shoes 1, 2 mounted on a stationary back-plate 3 and carrying friction linings 4 for engagement with a rotatable drum (not shown).

The upper ends of the shoes are adapted to be separated to apply the brake by an hydraulic actuator 5 mounted on the back-plate, the other ends of the shoes engaging a stationary abutment 6 on the back-plate.

A plate strut 7 extends across between the shoes adjacent to the actuator 5, a substantial part of one edge of the strut being in sliding contact with the back-plate 3 as shown more particularly in FIG. 3. The end portions of the other longitudinal edge lie between the webs of the shoes and the back-plate.

A bell-crank lever 8 for manual actuation of the shoes is pivotally mounted on a pin 9 fixed in the strut at one end, one arm 9 of the lever engaging in an opening 10 in the web of shoe 2, and the other arm 11 being adapted to be connected by a cable or other transmission member to a hand lever (not shown).

A tension spring 12 is connected between the strut and the web of the shoe 2 to keep the hand-brake lever assembly and strut in contact with that shoe.

A knurled or peripherally toothed stud 13 is fixed in the strut towards its other end, the stud projecting from the inner side of the strut.

The end of the strut adjacent to shoe 1 is provided with an opening 14 through which passes a pivot pin 15 for a bell-crank lever 16, the pin being fixed in the lever. As shown in FIG. 2, the opening 14 is of greater diameter than the pin 15 so that the pin and the lever have a certain amount of free movement relative to the strut. The pin is headed at both ends to retain the lever in contact with the strut. The first arm 17 of the lever is directed towards the stud 13, and its free edge, which is formed with teeth 18 co-operating with the teeth on the stud, is an arc of a circle with the pin 15 as its centre.

The second arm 19 of the lever projects through an opening 21 in the web of the shoe 1. The side of the arm 19 adjacent the rim of the shoe is provided with a cam surface 22 for engagement with the outer edge of the opening 21. In the "off" position of the brake there is a small clearance (shown in FIG. 3) between the arm 19 and the inner edge of the opening 21 corresponding to the desired clearance to be maintained between the shoes and the brake drum.

The bell-crank lever 16 is biassed towards the stud 13 by a plate spring 23 formed with a central loop 24, the extremities of the spring being formed with keyhole slots engaging over necked projecting ends of the stud 13 and pivot pin 15.

The operation of the adjuster will be readily followed.

In the application of the brake the shoe ends are separated by the actuator 5. As the shoe 1 moves outwardly the clearance between the arm 19 of the bell-crank lever and the opening 21 in the shoe web is first taken up. If, owing to wear of the shoe linings, the movement of the shoe exceeds that clearance the bell-crank lever moves outwardly with the shoe and the clearance between the pin 15 and the opening 14 in the strut is taken up and the toothed arm of the lever is disengaged from the stud. The bell-crank lever is then moved angularly by the shoe about the pin 15 through an angle corresponding to the movement of the shoe in excess of that required for taking up the clearances, and when the brake is released the toothed arm 17 of the bell-crank lever re-engages with the stud 13 in a fresh position so that the arm 19 provides a stop for the return movement of the shoe spaced outwardly from the previous position by an amount corresponding to the wear of the shoe linings.

FIG. 5 shows the stud 13 in more detail, the main knurled portion having a necked portion 25 extending axially from one side for co-operation with the plate spring 23 and a splined or serrated portion 26 extending axially from the other side. The serrated portion 26 is pressed into a hole in the strut 7 so that the stud cannot rotate and the end projecting beyond the strut is rivetted or pressed over to retain the stud in the strut.

The toothed stud replaces the arcuate toothed element of the earlier constructions which required accurate shaping. The teeth on the stud can be simply and inexpensively formed by knurling and it is relatively easy to locate accurately in the strut the pivot positions of the lever 16 and the fixing hole for the stud 13.

The teeth on the stud 13 could extend only partly around the stud but in that case the stud would have to be angularly positioned during assembly to ensure meshing with the lever 15.

Also by using the toothed stud 13 the strut 7 can be made from a single plate of thin sheet material in which a strengthening rib 27 is pressed.

I claim:

1. An automatic adjuster for a shoe-drum brake in which arcuate shoes mounted in a stationary back-plate are adapted to be separated at one end to bring them into engagement with a rotatable drum, and as the shoe linings wear the effective length of a two-part strut extending between the shoes adjacent to their actuated ends is automatically increased to compensate for wear, wherein one part of said strut comprises a bell-crank lever mounted to pivot on a pin passing through a clearance opening in the other part of the strut, a first arm of said lever being received in a slot of limited length in said shoe web and a portion of said arm being formed as a cam which, in the off position of the brake, engages with the radially outer end of said slot to define the off position of the shoe, and a second arm of said lever terminating in an arcuate toothed edge, a peripherally toothed stud is non-rotatably mounted on said other part of the strut, and resilient means are provided for urging said arcuate edge of the second arm of the lever into engagement with said stud.

2. An automatic adjuster for a shoe-drum brake as in claim 1 wherein the strut incorporates a manually operable lever adapted to engage one shoe and by reaction on this strut to apply the other shoe, the load being applied to said other shoe through and in alignment with the toothed engagement between said bell-crank lever and said toothed stud.

3. An automatic adjuster for a shoe-drum brake as in claim 1 wherein the strut incorporates a manually operable lever for applying the brake from a hand-lever and the two-part strut and said lever form an independent sub-assembly for fitting into and removal from the brake.

* * * * *